United States Patent
Kasdorf

(10) Patent No.: US 7,015,618 B2
(45) Date of Patent: Mar. 21, 2006

(54) ARRANGEMENT FOR ELECTRIC POWER SUPPLY TO A MOTOR

(75) Inventor: Wolfgang Kasdorf, Aarbergen (DE)

(73) Assignee: K-TEC GmbH, Schmitten (DE)

( * ) Notice: Subject to any disclaimer, the term of this patent is extended or adjusted under 35 U.S.C. 154(b) by 0 days.

(21) Appl. No.: 10/937,886

(22) Filed: Sep. 10, 2004

(65) Prior Publication Data

US 2005/0189842 A1   Sep. 1, 2005

(30) Foreign Application Priority Data

Sep. 11, 2003   (DE) ................... 103 42 221

(51) Int. Cl.
*H02K 5/14* (2006.01)
*H02K 13/00* (2006.01)

(52) U.S. Cl. .................. 310/239; 310/244; 310/242; 310/247

(58) Field of Classification Search ............. 310/239, 310/242, 244, 246, 247, 249, 248, 241, 238
See application file for complete search history.

(56) References Cited

U.S. PATENT DOCUMENTS

| 5,175,464 | A | * | 12/1992 | Smith ...................... 310/239 |
| 5,600,193 | A | * | 2/1997 | Matsushima et al. ..... 310/68 C |
| 5,886,448 | A |   | 3/1999 | Yoshida |
| 6,300,696 | B1 |   | 10/2001 | Wong |
| 6,339,272 | B1 | * | 1/2002 | Sato ........................... 310/87 |

FOREIGN PATENT DOCUMENTS

| DE | 9104028 | 11/1991 |
| DE | 4444645 | 6/1995 |
| DE | 69620532 | 4/2002 |
| DE | 10063405 | 7/2002 |

* cited by examiner

*Primary Examiner*—Darren Schuberg
*Assistant Examiner*—Leda Pham
(74) *Attorney, Agent, or Firm*—Dennison, Schultz, Dougherty & MacDonald

(57) ABSTRACT

The invention concerns an arrangement for supplying power to an electric motor having a commutator, comprising at least two carbon brushes (12, 14), as well as flat springs (16, 18) that subject said brushes to force in the direction of the commutator and proceed from a mounting and are connected to electric terminals. In order to enable a defined transfer of force from the flat springs to the carbon brushes, while at the same time ensuring that an unambiguous fixing of the flat springs into position and a secure current supply takes place, it is proposed that the flat springs (16, 18) have a U-shape with legs (38, 40) of unequal length, that a carbon brush (12, 14) be fastened to each longer leg, and that the shorter leg be connected electrically conductive to an at least partially encapsulated conductor path or printed circuit, which is at least a section of the mounting.

4 Claims, 3 Drawing Sheets

ARRANGEMENT FOR ELECTRIC POWER SUPPLY TO A MOTOR

The invention concerns an arrangement for supplying electric power to an electric motor having a commutator, comprising at least two carbon brushes and U-shaped flat springs having legs of unequal length that exert force upon said brushes in the direction of the commutator, and that proceed from a mounting and are connected to electrical terminals, wherein one of the carbon brushes extends outward from each of the longer legs of the flat springs.

An arrangement of the type initially described can be inferred from DE-U-91 04 028. In this case the flat springs consist of two sections of different materials that are connected to one another. The carbon brushes themselves penetrate the longer legs of the flat springs so that first there is an increased space requirement, and second the useful length of the carbon brushes is restricted.

With an arrangement for supplying power to a motor according to EP-B-0 823 768, flat springs are L-shaped in design, and are connected via a so-called connection anchor, via which the introduction of current takes place. The carbon brush itself partially penetrates the leaf spring. The carrier is quiver or cup-like in design and thus is space-taking.

A slip ring arrangement according to DE-A-101 58 381 has U-shaped bent contact shafts that lie on a slip ring. The bent ends of the contact shafts penetrate a printed circuit board that has a conducting track on the slip ring side.

With a brush-bearing plate according to DE-A-4 444 645, force is applied to carbon brushes via coil springs in the direction of a commutator.

A miniature electric motor according to DE-T-696 20 532 has carbon brushes that are connected to a brush holder via soldering or welding, for example.

Having the carbon brush lie with its reverse side on a leg of a flat spring, and being connected to the latter is proposed according to DE-C-100 63 405 to enable the optimal use of a carbon brush with simultaneous secure fastening on a carrier.

The present invention is based upon the problem of designing an arrangement of the type initially described, such that a defined transmission of force takes place from the flat spring to the carbon brush, while at the same time ensuring that an unambiguous fixing of the flat springs in place and a secure feeding of current will take place. Furthermore, the mounting should have a space saving design and be easy to install.

To solve the problem, the invention proposes that each flat spring be constructed in a single piece, that the shorter leg of the leaf spring have a section that extends projecting from this at a clamped level, which section is connected to an at least partially encapsulated conductor path or printed circuit, that the conductor path or printed circuit be the floor partition of a carrier that forms the mounting, which is penetrable by a shaft of the motor, and that the carbon brush lie, with its back surface that faces away from the commutator, flat on the longer leg of the carbon brush [sic] and be connected to it.

Deviating from the previously known state of the art, a flat spring with a U-shaped design acts upon the carbon brush, and via the flat spring defined forces can be transmitted to the carbon brush in the direction of the commutator. Furthermore, one leg of the flat spring is directly connected to a conductor track so that additional connection elements, which form transition resistors, are not necessary. At the same time, the partially encapsulated conductor path, which can be a section of a stamping lattice, or the partially encapsulated printed circuit, is a section of the mounting, from which basically only guide sections for the flat spring must proceed in order to ensure a defined orientation. Subsequently there results a basically two-dimensional mounting, for the installation of which in a motor or transmission housing only little space is required. Moreover, a section projects from the shorter leg, extending in the plane that is prestressed by said leg, and is connected to the conductor track or the printed circuit, such as soldered. The section can be rectangular in shape.

For the secure guidance of the flat springs in their transverse leg side region, it is provided that the encapsulated conductor track or the encapsulated printed circuit forms the floor partition of a carrier, from which preferably bridge-shaped guide sections extend, which delimit a U-shaped receptacle for the flat spring. In particular, it is proposed that the flat spring, which is fixed into position on the carrier, lie with its edge that extends between the transverse leg and the longer leg in a corner of the U-shaped receptacle. This measure serves to ensure that the longer leg, which accommodates the carbon brush, will exert only radial and no axial motion relative to the commutator. This is particularly advantageous during shifting of the motor.

Furthermore, the longer leg lies with a defined length adjacent to the opposite boundary of the receptacle. Consequently, defined forces are transferred via the carbon brush.

Since fastening the flat springs is accomplished via the at least partially encapsulated conductor track or printed circuit, from which guides for the flat springs project, the advantage of a lower constructional height results.

Moreover, connections for an external plug to the electrical power supply proceed from the carrier.

Furthermore, there exists the possibility that further mounting elements proceed from the floor partition that is formed by the partially encapsulated conductor track or printed circuit to accommodate electrical and electronic components such as choke, condenser or heat monitor.

It is provided in a further development of the invention that the longer leg of the flat spring is connected to the carbon brush via soldering or welding in particular. For this, the carbon brush lies flat against the longer leg with its back surface that faces away from the commutator, so that an optimal use of the carbon brush, in particular laminated carbon, that can have a metal layer on the flat spring side, is possible.

The invention will be explained in greater detail below on the basis of a preferred exemplary embodiment, wherein.

Figure 1:
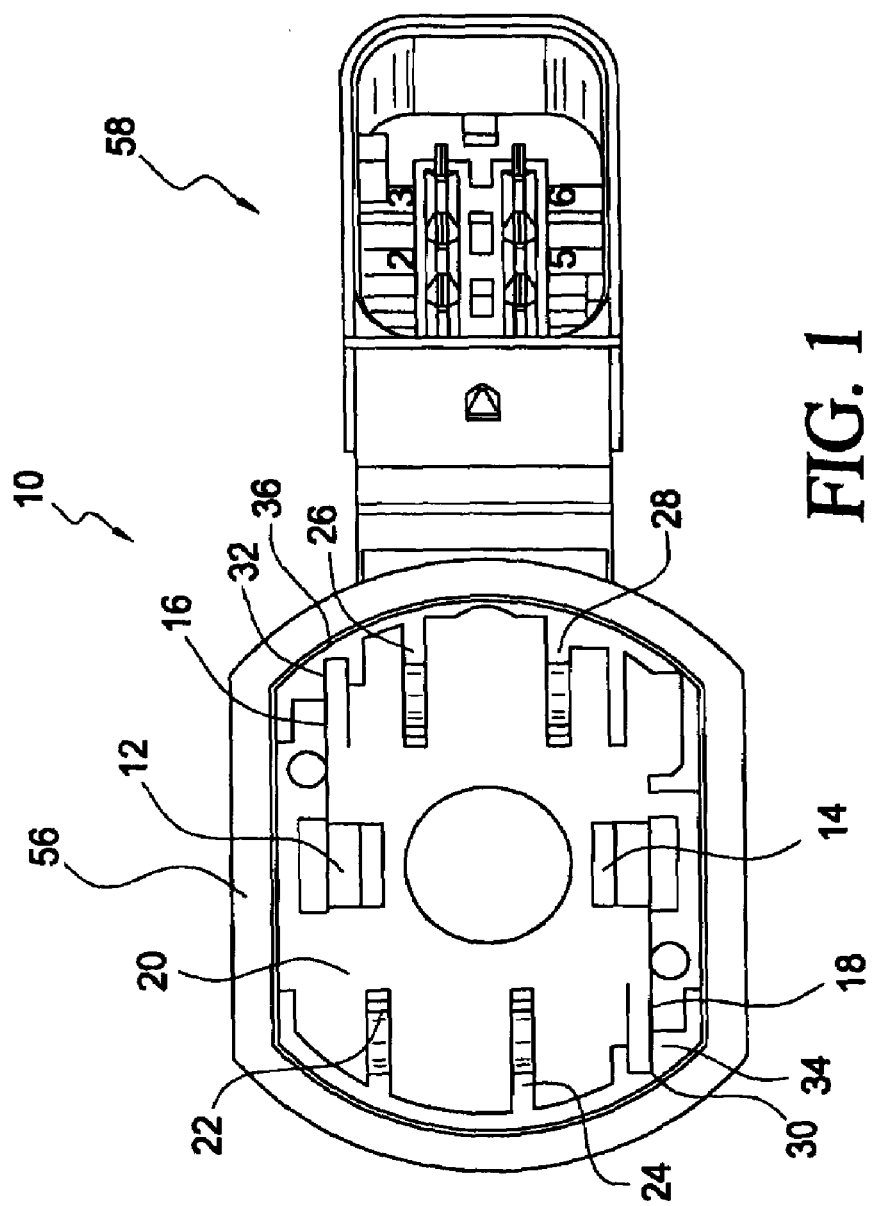
FIG. 1 shows a plan view on a carrier with an extension for an outside plug.

Represented in the figures is a carrier 10 for carbon brushes 12, 14 that is subjected to force via U-shaped bent flat springs 16, 18 in the direction of a not represented commutator of an electric motor, especially a motor transmission unit. The carrier 10 consists of an at least partially encapsulated conductor track such as a stamping lattice or a printed circuit. The encapsulated printed circuit or encapsulated conductor track forms the floor partition 20 of the carrier 10. Peg-like sections project from the floor partition 20 and serve as receptacles 22, 24, 26, 28 for, for example, electrical and electronic components such as choke, condenser and heat monitor. Furthermore, sections 34, 36 that form a U-shaped receptacle 30, 32 extend from the floor partition 20 to accommodate the flat springs 16, 18.

Each flat spring 16, 18 has a U shape with unequal legs 38 and 40 as well as the transverse segment 42 connecting these. The carbon brush 14 extends from the longer leg 38, which is preferably attached to the leg 38 via soldering or welding and for this purpose lies flat with its reverse side, as FIG. 1 makes clear. The leg 38 is bent outwardly (legs 44, 46) in the region of the carbon brush 14 in order to assure sufficient rigidity.

The flat spring 16, 18 is constructed as a single piece and in particular is an arched or folded stamped part. The flat spring 16, 18 furthermore preferably consists of steel or spring sheet material.

In order to make welding possible without difficulty, the carbon brush 12, 14 is preferably designed as a laminated carbon brush that has a metal layer on the flat spring side.

A section 48 extends from the shorter leg 44 in the plane that is clamped by said leg, wherein said section is connected electrically conducted to a conductor path in the floor partition 20. This can, for example, be accomplished via soldering. For this purpose, the partially encapsulated conductor track or the printed circuit can be passed through a soldering bath following outfitting of the carrier 10.

In order for the flat spring 18 to be unambiguously fastened into position in the receptacle 30, an edge running between the longer leg 38 and the transverse segment 42 lies on the corner 52 of the U-shaped receptacle 34 when the flat spring 18 is fastened. Conditioned by this, it is guaranteed that the flat spring 18 or its longer leg 38 can exert exclusively radial and not axial motion on the not represented commutator. Furthermore, the leg 38 lies with defined length on the corresponding delimiting wall 54 of the receptacle 30 so that as a result, a defined bendable leg length exists.

Figure 2:
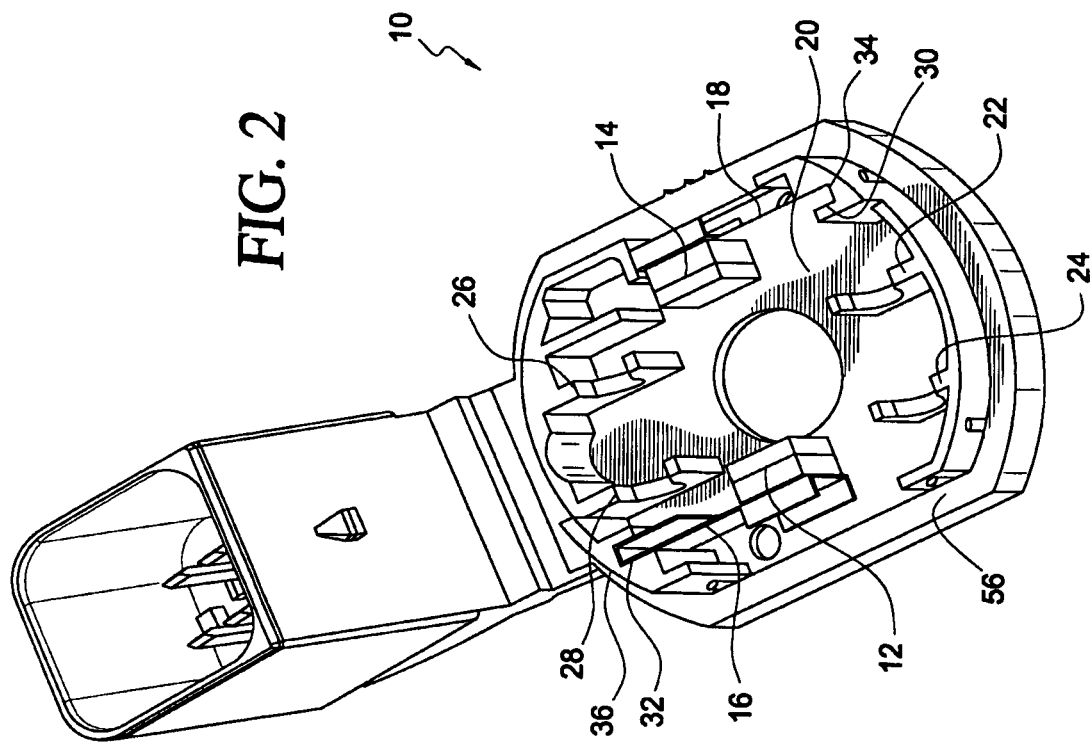
FIG. 2 shows the arrangement in accordance with FIG. 1 in perspective representation and FIG. 3 shows a section of the carrier in accordance with FIGS. 1 and 2 in enlarged representation.
Figure 3:
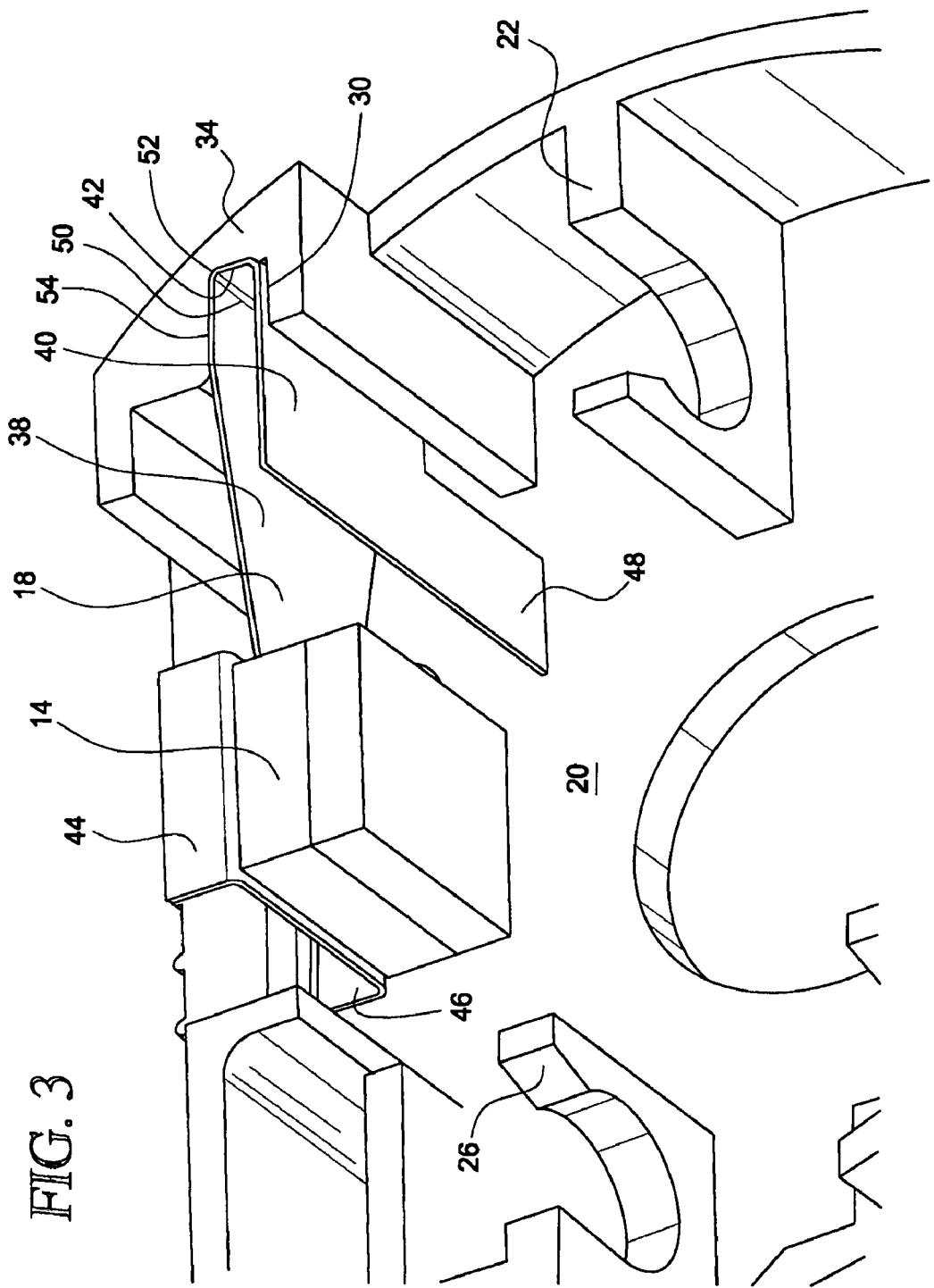

As FIGS. 1 and 2 make clear, the floor partition 20 have a circular frame-also called a ring or flange-that is assigned the reference number 56. This frame 56 is then fastened between the motor housing and the transmission housing, preferably by bracing the housings. An extension 58 for signal and current transmission can then take place from the frame 56 to the structural elements or the carbon brushes 12, 14 arranged by the carrier 10.

What is claimed is:

1. Arrangement for supplying power to an electric motor including a commutator, comprising:

a carrier penetrable by the commutator in a central portion thereof, and having a base or bottom part carrying an at least partially encapsulated conductor track or printed circuit;

a pair of leaf springs, each of said leaf springs being formed from a single piece bent into a U-shape having legs of unequal length comprising a longer leg and a shorter leg, the longer leg and the shorter leg being connected by a transverse portion, said longer leg having an inner side facing the shorter leg with a portion thereof extending therebeyond;

said leaf springs being fixed to the carrier opposite to each other with the central portion penetrated by the commutator therebetween, each of said leaf springs being mounted such that the shorter leg thereof is adjacent the central portion and the longer leg is adjacent an outer edge of the carrier, and having means for connection to an electric terminal;

a carbon brush attached to the inner side of the longer leg of each of said leaf springs on the portion extending beyond the shorter leg, each carbon brush having a rear side lying flat on the inner surface, and a running surface facing the central portion for contacting the commutator;

the shorter leg of each of the leaf springs having a projecting section extending co-planar with the shorter leg and connected to the conductor track or printed circuit;

said leaf springs subjecting the carbon brushes to force in the direction of the commutator.

2. Arrangement according to claim 1, wherein each of the leaf springs is fixed to the carrier in a U-shaped receptacle projecting from the base or bottom part of the carrier, the transverse section and adjacent legs of the leaf springs being fixed in the receptacle having a width that is substantially equal to spacing of the longer and shorter legs of the leaf springs in the region of the transverse segment, and wherein the leaf springs are fixed in position with an edge of the leaf springs between the transverse segment and the longer leg lying against a corner of the receptacle.

3. Arrangement according to claim 1, wherein the longer leg is connected to the carbon brush by soldering or welding.

4. Arrangement according to claim 2, wherein the longer leg is connected to the carbon brush by soldering or welding.

* * * * *